United States Patent
Qadir et al.

(10) Patent No.: US 8,140,908 B2
(45) Date of Patent: Mar. 20, 2012

(54) SYSTEM AND METHOD OF CLIENT SIDE ANALYSIS FOR IDENTIFYING FAILING RAM AFTER A USER MODE OR KERNEL MODE EXCEPTION

(75) Inventors: Haseeb Andul Qadir, Karachi (PK); Kinshumann Kinshumann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 11/766,905

(22) Filed: Jun. 22, 2007

(65) Prior Publication Data
US 2008/0320336 A1   Dec. 25, 2008

(51) Int. Cl.
G06F 11/00 (2006.01)
(52) U.S. Cl. ............... 714/42; 714/48; 714/25
(58) Field of Classification Search ............... 714/1–57, 714/723, 780; 710/52; 711/103, 115, 163, 711/164; 346/723; 371/19; 706/16
See application file for complete search history.

(56) References Cited

U.S. PATENT DOCUMENTS

| | | | |
|---|---|---|---|
| 4,696,003 A * | 9/1987 | Kerr et al. ................. 714/38 |
| 4,703,318 A * | 10/1987 | Haggerty .................. 345/634 |
| 4,809,276 A | 2/1989 | Lemay et al. |
| 5,488,691 A * | 1/1996 | Fuoco et al. .............. 714/52 |
| 5,881,221 A | 3/1999 | Hoang et al. |
| 5,974,576 A | 10/1999 | Zhu |
| 6,029,212 A * | 2/2000 | Kessler et al. ............ 710/52 |
| 6,049,895 A | 4/2000 | Sugimoto et al. |
| 6,728,907 B1 * | 4/2004 | Wang et al. .............. 714/47 |
| 6,832,342 B2 | 12/2004 | Fields, Jr. et al. |
| 6,845,363 B1 * | 1/2005 | Matsubara et al. ......... 705/16 |
| 6,845,470 B2 * | 1/2005 | Austen et al. ............. 714/38 |
| 7,024,593 B1 * | 4/2006 | Budd et al. ............... 714/48 |
| 7,111,213 B1 | 9/2006 | Dastidar et al. |
| 7,136,778 B2 | 11/2006 | Duron et al. |
| 7,155,590 B2 * | 12/2006 | Mathis .................... 711/164 |
| 7,457,990 B2 * | 11/2008 | Yuzawa .................... 714/42 |
| 7,571,362 B2 * | 8/2009 | Pellicone et al. ........... 714/723 |
| 2003/0074605 A1 * | 4/2003 | Morimoto et al. .......... 714/38 |
| 2003/0163767 A1 * | 8/2003 | Phelps ..................... 714/42 |
| 2004/0054989 A1 | 3/2004 | Harres |
| 2005/0028038 A1 * | 2/2005 | Pomaranski et al. ........ 714/42 |
| 2005/0120265 A1 * | 6/2005 | Pline et al. ............... 714/7 |

(Continued)

OTHER PUBLICATIONS

"Understanding Cisco IOS Software Embedded Self-Management Capabilities," Cisco Systems, Inc., 2007, cisco.com/en/US/products/ps6555/products_white_paper0900aecd8058338a.shtm.

(Continued)

Primary Examiner — Scott Baderman
Assistant Examiner — Sarai Butler

(57) ABSTRACT

A process executing on a computing system may encounter an exception. Pointers or other references created by the exception may identify portions of the computing system's memory containing the binary code that was executing at the time of the exception. The exception-causing code from the system memory may be compared to an original version of the code from a non-volatile source. If the comparison identifies a hardware corruption pattern, the computing system may communicate information about the process and the exception to an error analysis server. Using historical exception data, the error analysis server may determine if the identified corruption pattern is most likely the result of corrupt hardware at the computing system. If corrupt hardware was the most likely result of the exception, then the server may communicate with the computing system to recommend or initiate a hardware diagnostic routine at the computing system to identify the faulty hardware.

19 Claims, 9 Drawing Sheets

U.S. PATENT DOCUMENTS

| | | | |
|---|---|---|---|
| 2006/0136656 A1* | 6/2006 | Conley et al. | 711/103 |
| 2006/0218444 A1* | 9/2006 | Yoshida et al. | 714/20 |
| 2006/0248406 A1* | 11/2006 | Qing et al. | 714/38 |
| 2006/0271809 A1* | 11/2006 | Ichikawa et al. | 714/2 |
| 2007/0050686 A1* | 3/2007 | Keeton et al. | 714/48 |
| 2007/0094560 A1* | 4/2007 | Ergin et al. | 714/736 |
| 2007/0130434 A1* | 6/2007 | Chu et al. | 711/163 |
| 2007/0168744 A1* | 7/2007 | Pal et al. | 714/38 |
| 2007/0192667 A1* | 8/2007 | Nieto et al. | 714/780 |
| 2007/0266201 A1* | 11/2007 | Estakhri et al. | 711/103 |

OTHER PUBLICATIONS

"Deploying Microsoft Operations Manager with the BIG-IP system and iControl," F5 Networks, Inc., 2007, f5.com/solutions/deployment/mom_bigip9_dg.html.

"Designing Monitoring and Maintenance Procedures," Microsoft Corporation, 2007, microsoft.com/technet/prodtechnol/exchange/2000/deploy/upgrademigrate/series/planningguide/p_07_tt1.mspx.

* cited by examiner

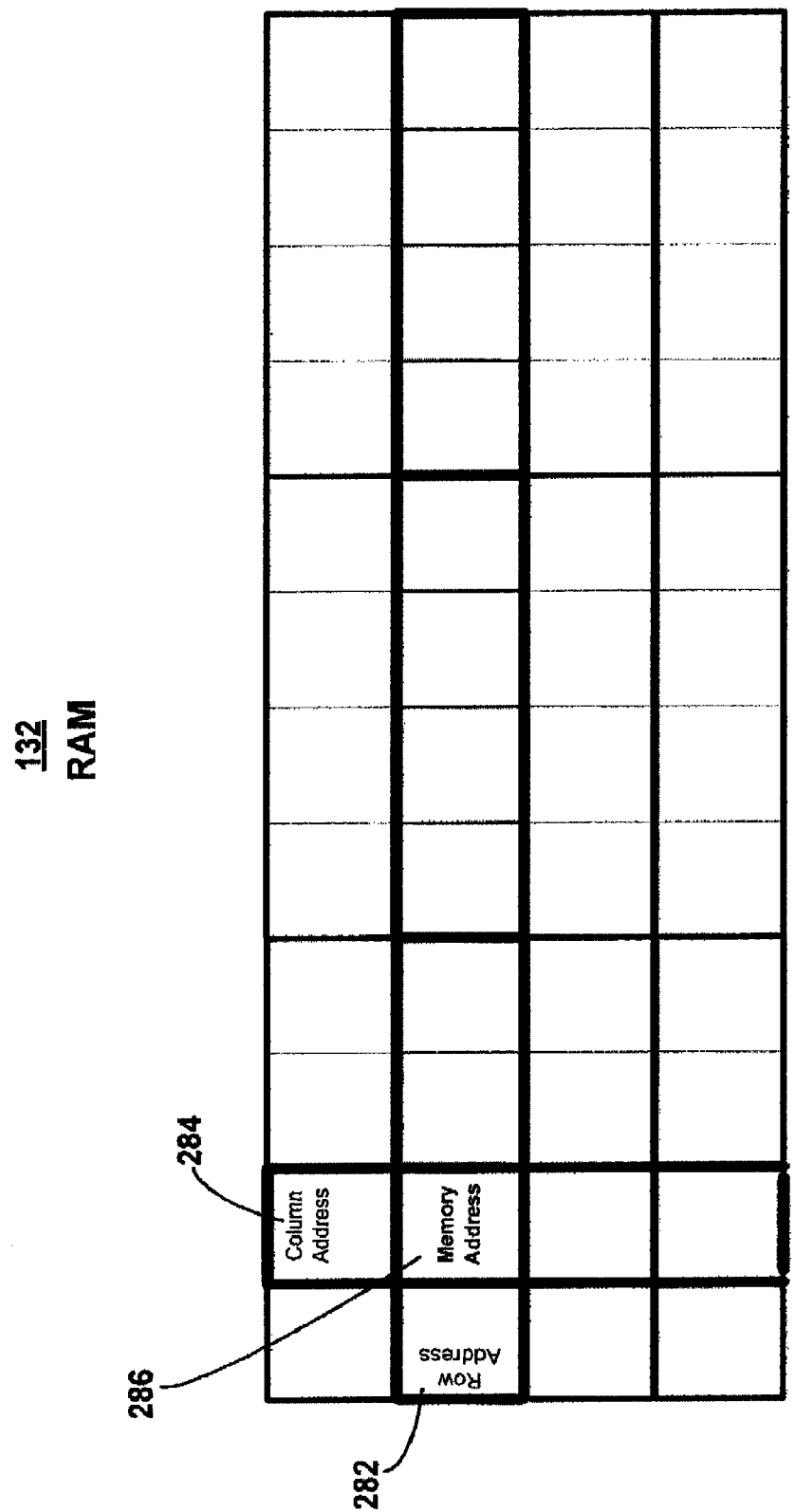

SYSTEM AND METHOD OF CLIENT SIDE ANALYSIS FOR IDENTIFYING FAILING RAM AFTER A USER MODE OR KERNEL MODE EXCEPTION

BACKGROUND

This Background is intended to provide the basic context of this patent application.

Operating systems (OS) are a key building block in the development of computing systems. Over the several decades since personal computing has become widespread, operating systems have substantially increased in complexity. The ability to multi-task and support concurrent processes gives even modest personal computers the appearance of simultaneously running a wide variety of programs from word processors to Internet browsers.

In fact, though, virtually all microprocessor-based systems run one program at a time, using a scheduler to guarantee that each running program is given processor time and system memory in sufficient quantities to keep running. This task can become quite complex. Each process running on a computer can spawn individual tasks called threads. Some threads can spawn subordinate threads. It is common to have dozens, or even hundreds, of threads active at a given time executing any number of programs or processes running in both user mode and kernel mode. To complicate matters, the computer may have limited resources, such as disk storage, network input/output, and program memory. The operating system (OS) executing on the computer coordinates all scheduling and management of various user and kernel mode processes, however, if the underlying hardware (i.e., the processor or system memory) is faulty, even perfect OS operation will not prevent a system failure.

User mode processes (i.e., word processing and other user applications) are heavily monitored by the OS and do not interact directly with the computer hardware. Because of their limited access to the computer's underlying hardware, user mode processes have a limited ability to cause a system freeze or crash in the event of an exception. Kernel mode processes (i.e., device drivers and other component interfaces) execute outside of user control, directly access hardware, and may easily cause system failure if an exception occurs. The OS relies on underlying hardware to ensure error-free user and kernel mode process function. Typical approaches to diagnosing and solving exceptions are live debugging of the application process or capturing detailed information about the processes involved from the computer memory at failure time for post-mortem analysis at a server.

Corrupt or malfunctioning hardware components may produce an error which may be difficult to identify quickly. For example, the process data captured at a client system and forwarded to an error analysis server may not contain enough information to diagnose hardware failures at the time of a crash. Further, server or "backend" analysis incurs the additional delays involved with collecting data at the client, sending the data to the analysis server, conducting the analysis, and returning data or instructions to the client.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A client-side analysis for RAM failures may diagnose and remedy exceptions caused by hardware failures without the limitations of typical server-side analyses. A process executing on a computing system may encounter an exception. Pointers or other references created by the exception may identify portions of the computing system's memory that contain the binary code that was executing at the time of the exception. The exception-causing code from the system memory may be compared to an original version of the code from a non-volatile source. If the comparison identifies a hardware corruption pattern, the computing system may communicate information about the process and the exception to an error analysis server. Using historical exception data, the error analysis server may determine if the identified corruption pattern is most likely the result of corrupt hardware at the computing system. If corrupt hardware was the most likely result of the exception, then the server may communicate with the computing system to recommend or initiate a hardware diagnostic routine at the computing system.

DRAWINGS

FIG. 2c is a simplified and representative block diagram of RAM;

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
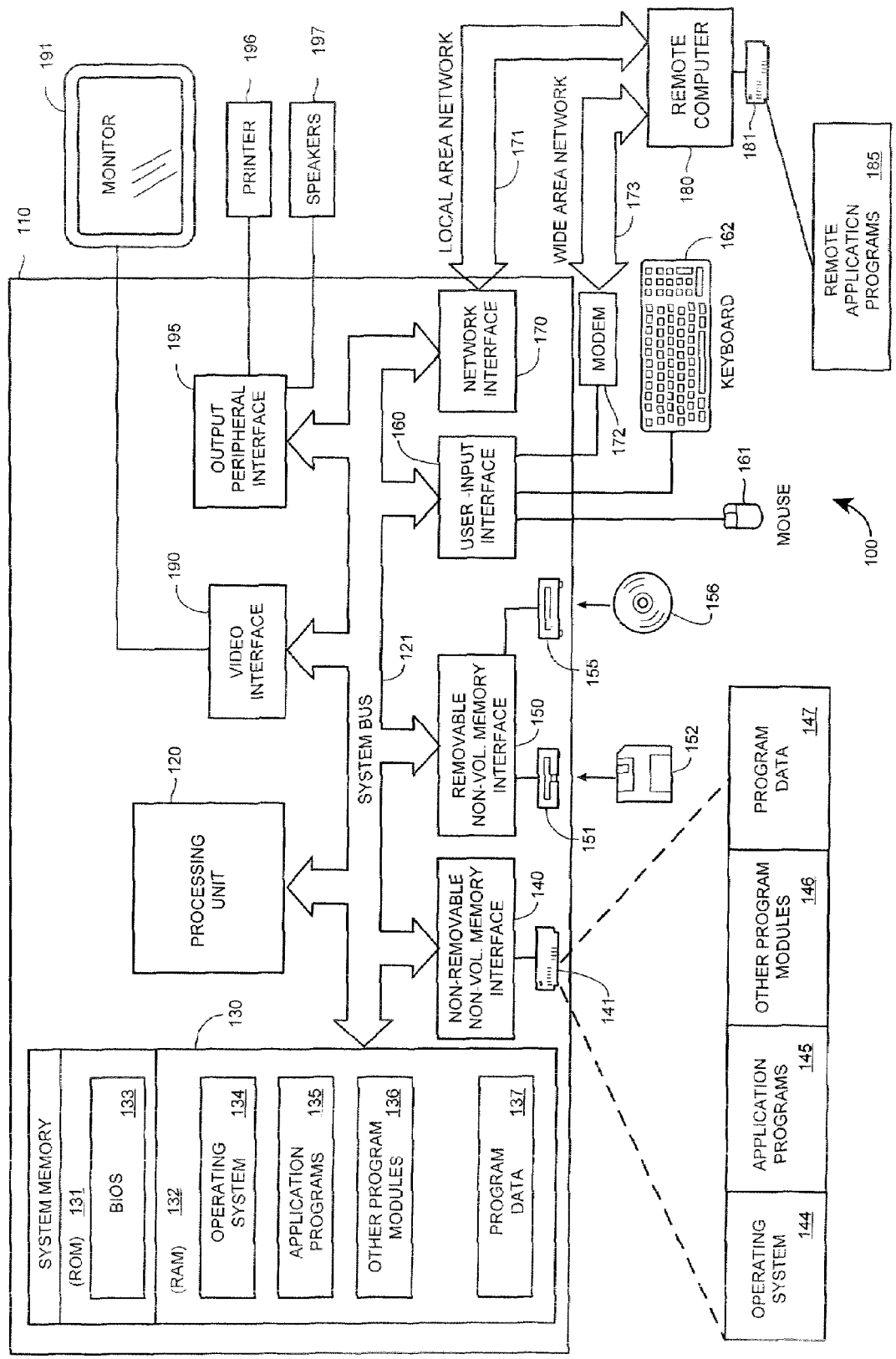
FIG. 1 is a simplified and representative block diagram of a computer.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing system environment 100 be interpreted as having any dependency or requirement relating to any one or combination of components illustrated in the exemplary computing system environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer or client machine 110. Components of computer 110 may include, but are not limited to, a processing unit 120, a system memory 130, and a system bus 121 that couples various system components including the system memory to the processing unit 120. The system bus 121 may include any of several types of bus structures such as a memory bus or memory controller, a peripheral bus, and a local bus using any of a variety of bus architectures. The system bus 121 or memory controller may include architectures generating and transporting signals to control the reading and writing of information from and to the system memory 130, and may interface the system memory 130 with the processing unit 120 and other components of the system 100. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the Peripheral Component Interconnect-Express (PCI-E).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Generally, system 100 faults, such as application failures, hangs, or exceptions may describe an event that occurs during the execution of a program that crashes or stalls the normal operation of the system 100 or requires the execution of code outside the normal flow of control. These system 100 problems may occur in both hardware and software. Hardware exceptions may be initiated by the processing unit 120 and may result from the execution of certain, invalid instruction sequences in applications 135, 145 or the operating system 134, 144 (i.e., division by zero) or an attempt to access an invalid system memory 130 address. For example, the computer 110 may detect an invalid parameter value that is specified by an executing process of an application 135, 145 or the operating system 134, 144. Faults may relate to a wide variety of hardware or software modules. Software modules operating in user or kernel mode may include, without limitation, programs executing on the computer's 110 system memory 130 such as the BIOS 133, the operating system 134, application programs 135, other program modules 136, and the program data 137. Additionally, the failures, hangs, and exceptions may relate to problems associated with applications stored in non-removable, non-volatile memory 141 and may include, without limitation, the operating system 144, application programs 145, other program modules 146, or the program data 147. Faults may also relate to applications stored on or executing from removable, non-volatile memory 151, 155 such as a floppy disk 152 or an optical disk 156. The faults may also relate to remote application programs 185 executing on the remote computer 180 or any hardware device, interface, network connection, or internal connection associated with the computers 110, 180.

Figure 2A:
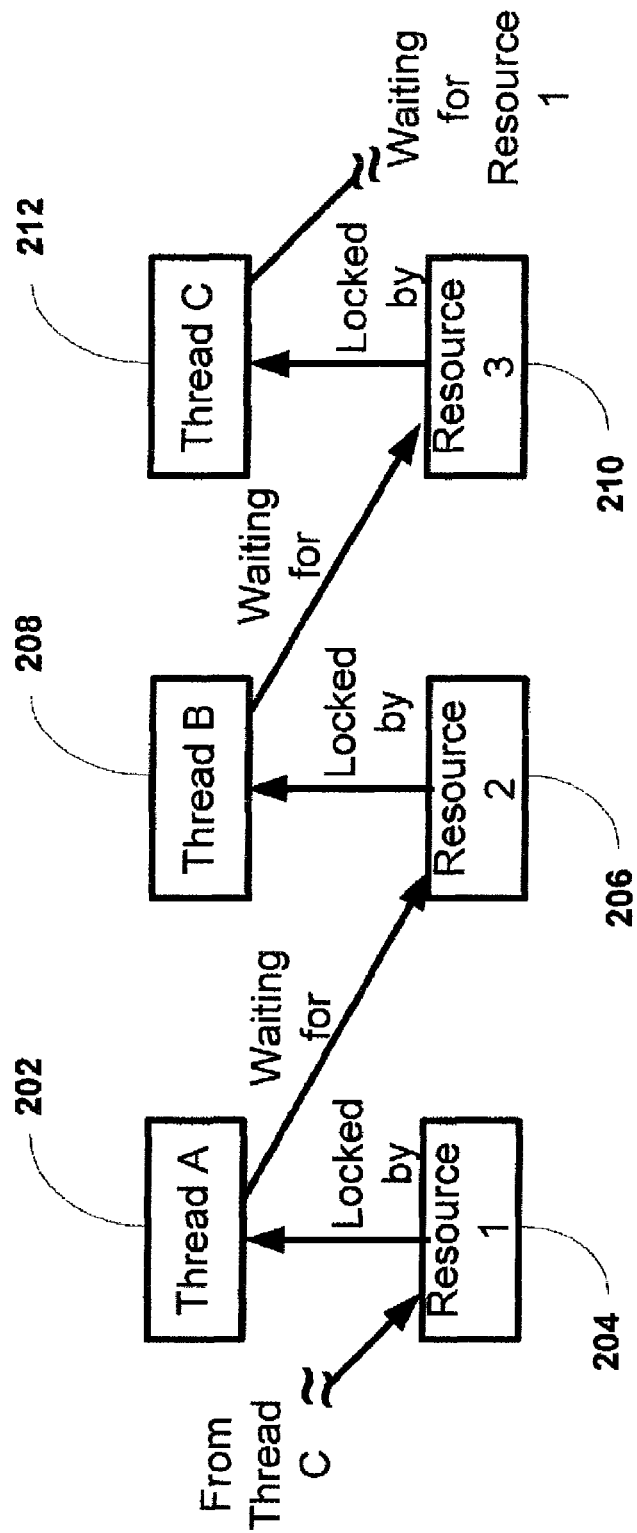
FIG. 2a is a block diagram showing a wait-chain relationship in a computer.

FIG. 2a is a block diagram showing a wait-chain relationship illustrating a condition in a computer known as a deadlock. Thread A 202 owns the lock on Resource 1 204, Thread A 202 is also waiting for Resource 2 206. Thread A 202 cannot access Resource 2 206 because it is locked by Thread B 208. In turn, Thread B 208 is waiting for Resource 3 210. Resource 3 210 is locked by Thread C 212. To this point, this is not necessarily a problem. If Thread C 212 releases Resource 3 210, the dependencies will clear. However, if Thread C 212 is waiting for Resource 1 204, or Resource 1 204 is malfunctioning or corrupt, a deadlock exists and the processing associated with each of the three threads 202, 208, 212 will stop. This is one form of a system fault caused by a wait-chain among resources and threads.

A related situation, a hang, may occur when one thread, for example, Thread C 212, may not be waiting for another resource, but instead is slow or stopped. All the preceding elements (threads 202, 208 and resources 204, 206) will be blocked until Thread C 212 releases Resource 3 210. Resources may also cause hangs. For example, if Resource 3 210 is a network connection, it may itself be too slow or unable to make progress, even though its owner, Thread C 212 is active and making progress. Further, an invalid memory reference, corrupt, or malfunctioning RAM 132 may also cause a hang, deadlock, or other application 135, 145 failure. A third related wait-chain relationship is an orphaned resource, which occurs when one thread, for example, Thread C 212, is simply non-existent, either because it terminated or was killed. A chain that contains an orphaned resource also represents a hang, because all the threads that are waiting for the orphaned resource to be released are prevented indefinitely from making progress.

Figure 2B:
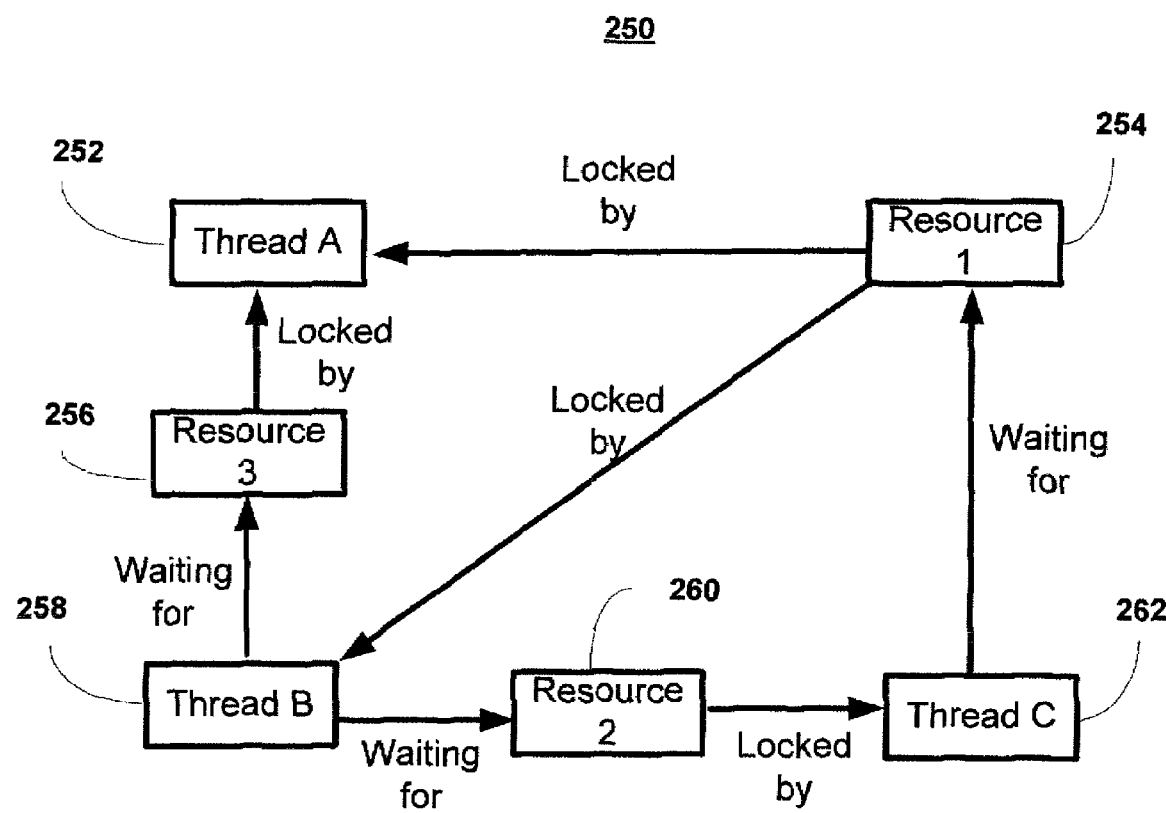
FIG. 2b is a block diagram depicting a multiple thread/resource relationship.

As well, the threads and resources involved in a wait-chain are not necessarily restricted to one-to-one relationships. As shown in FIG. 2b, a thread can wait for multiple resources and a resource can be owned by multiple threads. In FIG. 2b, a graph 250 of threads and resources shows Thread A 252 owns Resource 1 254. Thread B 258 is waiting for Resource 2 260 and Resource 3 256. Resource 3 256 is owned by Thread A 252. In the other branch of the graph, Thread B 258 is waiting for Resource 2 260 and owns Resource 1 254. Resource 2 260 is owned by Thread C 262. The deadlock cycle is completed by Thread C 262 waiting for Resource 1.

The resources of FIGS. 2a and 2b may be those traditionally thought of as resources, such as, system memory 130 addresses, print queues, database queues, etc. However, with respect to their ability to participate in wait-chain relationships, other functions may also fall into the category of resources that are atypical. For example, a remote procedure call (RPC) may cause the caller thread to wait until the called thread returns the result. In this case, the RPC may be owned by the called thread. When a result for the called procedure times out or is lost in transmission, the RPC may be part of a wait-chain that represents a hang, as discussed above. Other kinds of response-oriented operations, such as acquiring locks or semaphores, waiting for network or I/O connections, or sending a message and waiting for the receiver to process it, may also act in this manner.

The faults described in relation to FIGS. 2a and 2b may be the result of one or more of the resources 204, 206, 210, 254, 256, 260 malfunctioning or being corrupt. For example, a corrupt resource, such as system memory 130, may result in a hang or deadlock if an application 135, 145 process attempts to read from or write to a virtual address of the resource. FIG. 2c is an illustration of a portion of system memory 130, such as a RAM chip 132. One example of a RAM chip 132 may be a Dynamic RAM (or DRAM) chip as produced by Micron Technology, Inc. of Boise, Id. Of course, there are many possible types of RAM 132 including, without limitation, Synchronous DRAM (SDRAM), Double-Data-Rate SDRAM (DDR), Direct Rambus DRAM (RDRAM), and others. The RAM 132 may be represented as an XY grid pattern of rows 282 and columns 284. A read or write instruction during execution of an application 135, 145 or operating system 134, 144 process, may cause the processing unit 120 to sent the row 282 address to the RAM chip 132 followed by the column address 284. Logic on the RAM chip 132 may latch each of the row 282 and column 284 addresses, in turn, to read to or write from a memory address 286. In a read operation, the RAM chip 132 will then send the data stored at the memory address 286 to the processing unit 120 for execution within the application 135, 145, or operating system 134, 144 process. In a write operation, the RAM chip will then write data to the memory address 286 as part of the application 135, 145, or operating system 134, 144 execution.

Figure 3A:
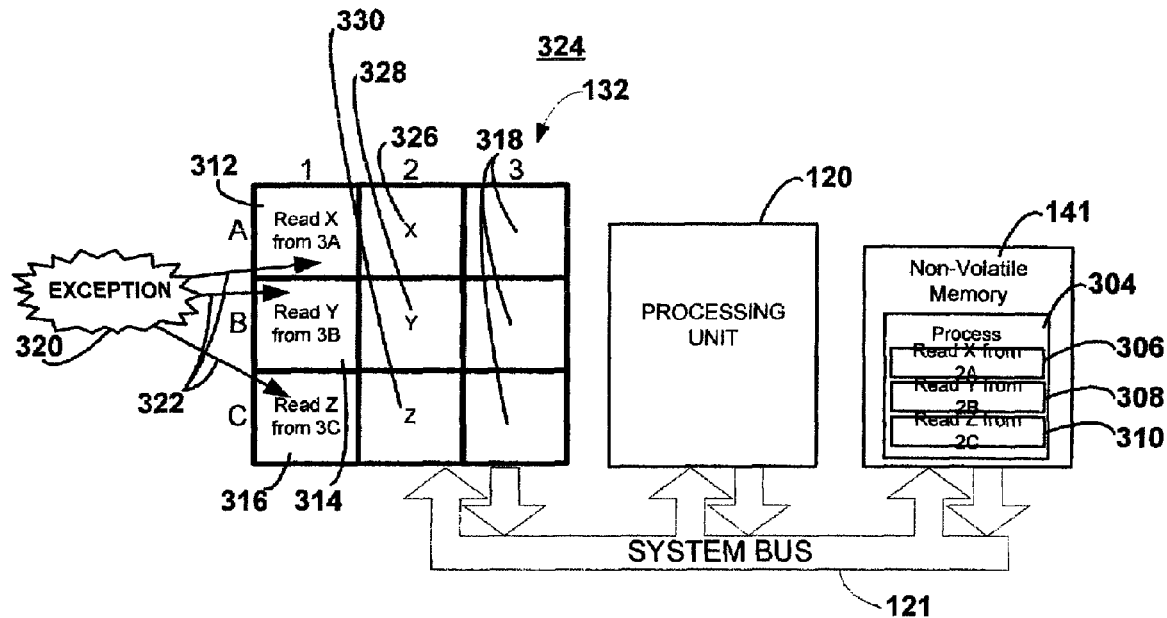
FIG. 3a is a simplified and representative block diagram of a hardware corruption pattern.
Figure 3B:
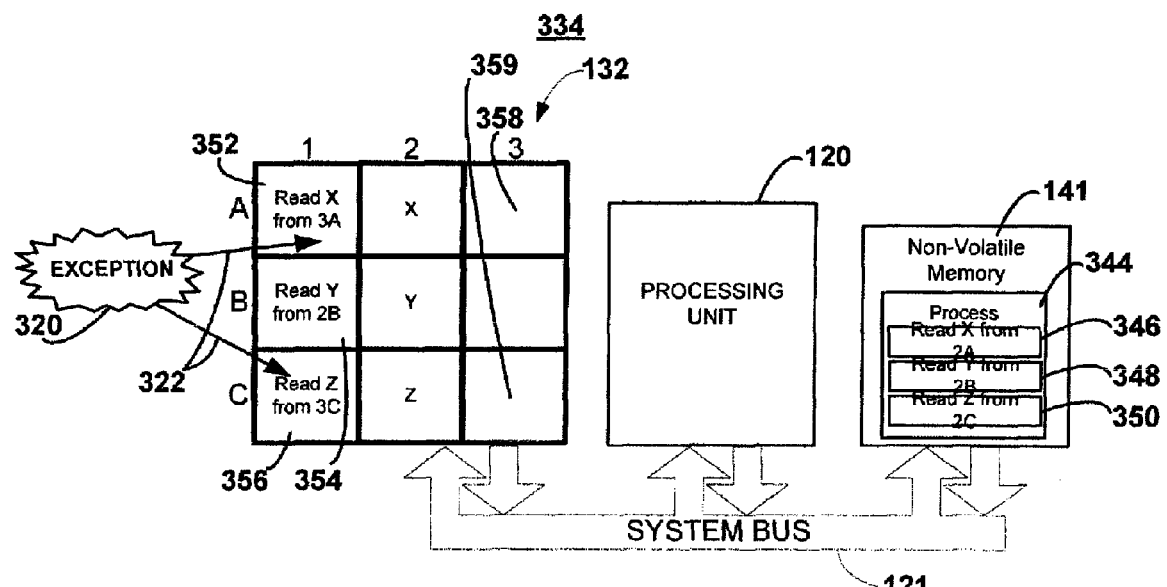
FIG. 3b is another simplified and representative block diagram of a hardware corruption pattern.
Figure 4:
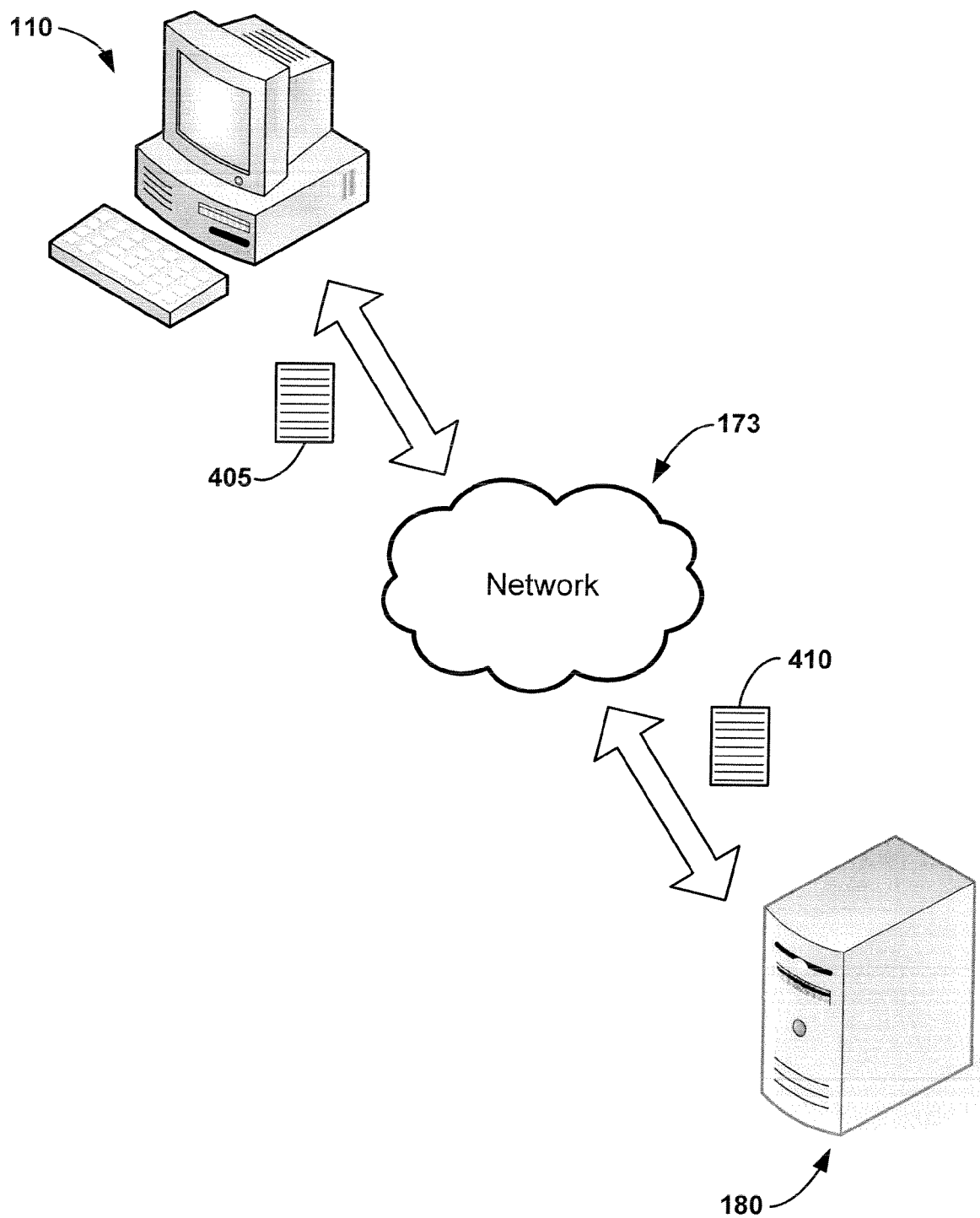
FIG. 4 is a simplified and representative block diagram of a system for client side analysis for identifying failing ram after a user mode or kernel mode exception.

An error may occur at the RAM chip 132 that may cause one of the fault situations described above. With reference to FIGS. 2c, 3a, and 3b, corruption patterns may indicate a malfunctioning or corrupt RAM chip 132. In one embodiment, any identifiable hardware fault or exception 302 that generally occurs in an evenly distributed fashion during execution of different application 135, 145, operating system 134, 144 processes, other program modules 136, 146, or program data 137, 147 may be a hardware or RAM failure. A process 304 having a number of instructions 306, 308, 310 may be loaded from non-volatile memory 141 into an address 312, 314, 316 in RAM 132 over the system bus 121. However, the RAM 132 may incorrectly transcribe the instructions to the RAM addresses 312, 314, 316. For example, the instruction 306 as stored in the non-volatile memory 141 may be "read X from address 2A." However, the RAM 132 may incorrectly write the instruction 312 as "read X from address 3A." The processing unit 120 may attempt to execute the instruction 306 of the process 304 from address 312 in RAM 132. Because the instruction 306 at address 312 refers to an address 318 that does not contain the expected "X," an exception 320 may occur. The exception 320 may produce a number of pointers 322 or other data that may indicate a plurality of addresses 312, 314, 316 of the incorrect instructions being referenced in the RAM 132. In a "one-bit" corruption pattern 324 (FIG. 3a), the RAM 132 may consistently return data from an incorrect memory address 318 that is one bit off from the correct, requested addresses 326, 328, 330 of the instructions 306, 308, 310. If the RAM chip 132 consistently returns incorrect or unexpected data 318 from multiple application 135, 145, operating system 134, 144, program module 136, 146, or other program data 137, 147 processes that, as indicated in pointers 322 or other data produced by the exception 320, is one bit off from an expected memory location 326, 328, 330, then the RAM 132 may be corrupt.

In a "stride" memory corruption pattern 334 (FIG. 3b), a hardware device such as a RAM chip 132 may return data stored at addresses in which each alternating reference or instruction is incorrect. As described above in relation to FIG. 3a, a process 344 having a number of instructions 346, 348, 350 may be loaded from non-volatile memory 141 into an address 352, 354, 356 in RAM 132 over the system bus 121. However, the RAM 132 may incorrectly transcribe each alternating instruction to the RAM addresses 352, 354, 356. For example, the instruction 346 as stored in the non-volatile memory 141 may be "read X from address 2A." However, the RAM 132 may incorrectly write the instruction 312 as "read X from address 3A." Similarly, the instruction 350 as stored in the non-volatile memory 141 may be "read Z from address 2C." However, the RAM 132 may incorrectly write the instruction 356 as "read Z from address 3C." The processing unit 120 may attempt to execute the instructions 346, 350 of the process 344 from the addresses 352, 356 in RAM 132. Because the instructions 346 and 350 at addresses 352 and 356 refer to addresses 358 and 359, respectively, that do not contain the expected "X" and "Z," an exception 320 may occur. The exception 320 may produce a number of pointers 322 or other data that may indicate a plurality of addresses 352, 356 of the incorrect instructions being referenced in the RAM 132. Therefore, in a "stride" corruption pattern 334, the RAM 132 may return incorrect data from alternating incorrect memory addresses 358, 369 and the RAM 132 is likely corrupt.

With reference to FIGS. 1-7, a method for detecting and diagnosing RAM and other hardware failures after a user mode or kernel mode exception 320 is described. In one example of an exception 320, an application executing on a client machine 110 such as Microsoft Word may become unresponsive while running on a Microsoft Windows-type OS 134, 144 during the printing process and machine 110 may forcibly terminate the application or shut down the machine 110. The root cause of this particular failure may be that a Word process has referenced a portion of hardware or RAM 132 that is malfunctioning or corrupt. Live debugging may obtain information about the Word process with the assistance of live support personnel. Also, current Windows Error Reporting (WER) may send post-mortem process memory dump information regarding the failed application.

Generally, an exception 320 may prompt a client machine 110 to determine whether or not the exception 320 was due to corrupt hardware. A reporting API 500 and a client-side analysis API 600 may gather and send a report 405 to a WER server or other remote error reporting service 180 containing data regarding the failed process. In the remote error reporting service 180 may send commands, requests for additional information, or other responses 410 to the client machine 110.

Beginning at block 502, the OS may detect an exception 320 as previously described and initiate a reporting API 500 on the client machine 110. At block 504, a user or system setting may determine whether or not the exception 320 should be reported through WER to a remote error reporting service 180 such as the Microsoft Watson remote application program 185, a present user, or any other destination. If, at block 504, the report is denied, the reporting API ends. If, at block 504, the report is acknowledged, at block 506, the API may open a memory module shared between the Watson remote application program 185 and the computer 110. At block 508, the reporting API 400 may create a set of process bucketing parameters which uniquely describe the exception 320. The process bucketing parameters may include, but are not limited to, the name of the executable file or process that generated the exception 320, the failed file or process version, a timestamp of the failed file or process, a hash of the failed thread's call stack, an address offset within a RAM chip 132, and type code parameters indicating what kind of failure occurred (i.e., in-process mutex, out-of-process mutex, deadlock, failed process has a modal dialog, reporting was invoked via end task, thread wait, process wait, or hardware failure). At block 510, the reporting API 500 may write the bucketing parameters to the shared memory opened at block 506 or may add the parameters to a report 405. Additionally, the reporting API 500 may keep a history of the exceptions 320 seen in user and kernel mode modules at the client machine 110 and may write the bucketing parameters to a portion of memory 130, 141, 151, 155 at the client machine 110.

The client machine 110 may then proceed with a client-side analysis (CSA) API 600 (FIG. 6) to determine whether or not the exception 320 is due to malfunctioning hardware or RAM 132. At block 602, the client machine 110 may initialize the CSA API 600. In one embodiment, the computer 110 invokes the CSA API 600 when an exception 320 originates with a user mode process. In a further embodiment, an exception 320 that invokes the CSA API 600 is one that minimizes computer 110 resource consumption during a subsequent analysis. For example, configuring the CSA API 600 to run only when the system 100 encounters certain exceptions 320 (i.e., the STATUS_ILLEGAL_INSTRUCTION (0xC000001DL) or the STATUS_PRIVILEGED_INSTRUCTION (0xC0000096L) exceptions 320) may optimize computer 110 performance during an analysis of the failure. Of course, other exceptions 320 or other process faults may also trigger the CSA API 600 and may be customized by a computer 110 user or optimized by the CSA API 600 or other program modules 136, 146.

At block 604, the CSA API 600 may identify and retrieve a copy of the code running on the computer 110 at the time of the failure. In one embodiment, the CSA API 600 discovers pointers 322 to the exception parameters, the exception thread's context, the failing process' call stack and working set. For example, as discussed in relation to FIGS. 3*a* and 3*b*, the exception 320 may generate a plurality of pointers 322 that refer to locations in the RAM 132 that were either being read from or written to at the time of the exception 320. The CSA API 600 may use the pointers 322 to identify and retrieve the most relevant code related to the fault. In a further embodiment, the CSA API 600 limits the total amount of data collected at block 604 to facilitate efficient and precise analysis. For example, the CSA API 600 may limit the amount of fault-related data collected at block 604 to 512 KB of pages. The upper threshold of collected fault data may be modified by a parameter at the client machine 110, for example, a registry key. The CSA API 600 may also collect any amount of data stored in RAM 132 or the system memory 130 that is related to the exception 320 and store a complete or partial history of data related to the failure. Of course, there are other heuristics for identifying and retrieving a representation of the fault-causing code as it existed at the time of the exception 320.

At block 606, CSA API 600 may identify and retrieve an original copy of the code that caused the system failure. In one embodiment, the CSA API 600 loads the original code from a non-volatile memory 141 of the client machine 110. For example, the CSA API 600 may load the original code from a hard disk 141 of the computer 110. To ensure that the API 600 loads an uncorrupted copy of the original code, unbuffered I/O may be used to read the binaries corresponding to the original code from the hard disk 141. Using unbuffered I/O may avoid the situation where the cache memory backing the hard disk's 141 file mapping is corrupted. The amount of original code read from the non-volatile source may be limited to a maximum amount to avoid any potential performance bottlenecks due to retrieving the original code. In a further embodiment, the code loaded at block 606 is an original, uncorrupted copy of the fault-causing code that resulted in the exception 320.

At block 608, the CSA API 600 may compare the exception-causing code retrieved at block 604 with the original copy of the code retrieved at block 606. The client machine 110 or another remote computer (i.e., a WER server or remote error reporting service 180) may perform the comparison. In one embodiment, the CSA API 600 may execute a byte-for-byte comparison of the exception-causing code and the original copy of the code. In a further embodiment, the CSA API 600 may ignore mismatched bytes between the exception-causing code and the original code that are known to be modified by the OS 134, 144 during the normal execution of the code or similar types of code. The exception 320 may be caused by relocatable code (i.e., machine language code that may be executed on the computer 110 from any location of the memory 130, for example, Dynamic Link Libraries or "DLLs"). During execution of relocatable code, the OS 134, 144, may apply a memory address 286 to portions of the code. The CSA API 600 may read and apply the same memory addresses 286 to the original copy of the code as were applied by the OS 134, 144 to the exception-causing code during the execution of the process that caused the exception 320. The CSA API 600 may "pre-process" the original code to ensure the memory relocation instructions of the exception-causing code match or are applied to the original code before performing the comparison at block 608.

At block 610, the CSA API 600 may determine if the comparison performed at block 608 identified a hardware corruption pattern. In one embodiment, the CSA API 600 determines the existence of a corruption 324, 334 pattern as discussed in relation to FIGS. 3*a* and 3*b*. The CSA API 600 may discover corruption patterns that are most common when memory 130 is corrupt, for example, the one-bit 324 and stride 334 patterns. Discovering corruption patterns that likely indicate failing memory 130 or other hardware may filter out exceptions 320 caused by software design or other non-hardware issues.

If a corruption pattern was found, at block 612, the CSA API 600 may add information to the report 405 for further analysis. In one embodiment, the CSA API 600 adds a flag indicating the type of corruption pattern found, the copy of the code that was running on the system at the time of the fault (as retrieved at block 504), and throttling information to the report 405. For example, the flag added to the report 405 may indicate the specific corruption pattern discovered, such as MCP=Bit or MCP=Stride. The throttling information may include any data that may allow the CSA API 600, the remote error reporting service 180, or another service or module to determine an optimal time to determine if an exception 320 was caused by failing RAM 132. For example, the CSA API 600 may execute at specified durations based on factors such as time intervals between exceptions 320, times at which the computer 110 may be inactive, a set period of time, or a number of exceptions 320 detected. Further, a remote error reporting service 180 may be configured or updated to determine the optimal time to execute a RAM analysis.

At block 614, the CSA API 600 may check to see if an error threshold has been met at the client machine 110. In one embodiment, the CSA API 600 accesses a set of heuristics that determine when the client machine 110 should perform a client-side health analysis due to a number and frequency of errors found at block 610. The number and frequency of errors may correspond to the CSA API 600 detection of hardware corruption patterns. For example, if the CSA API 600 determines that an exception 320, such as a one-bit corruption pattern 324, has occurred at the client machine 110 ten times during a previous thirty days, the CSA API 600 may determine that a threshold number for that error was exceeded. Further, if an amount of time has elapsed since a health check of the client machine 110 or the particular process or module 136, 146 involved in the exception 320, then the threshold may have been exceeded. A user or the remote error reporting service 180 may establish the threshold. Of course, many other types of errors or corruption patterns may be checked from a history of errors to determine if a threshold has been met or exceeded.

Further, the set of heuristics may eliminate a number of "false positive" corruption patterns identified by the CSA API 600. For example, the heuristics may filter and eliminate random RAM 132 errors that may have been due to a variety of factors such as design, solar flares, electrical surges, or other random corruptions.

Figure 5:
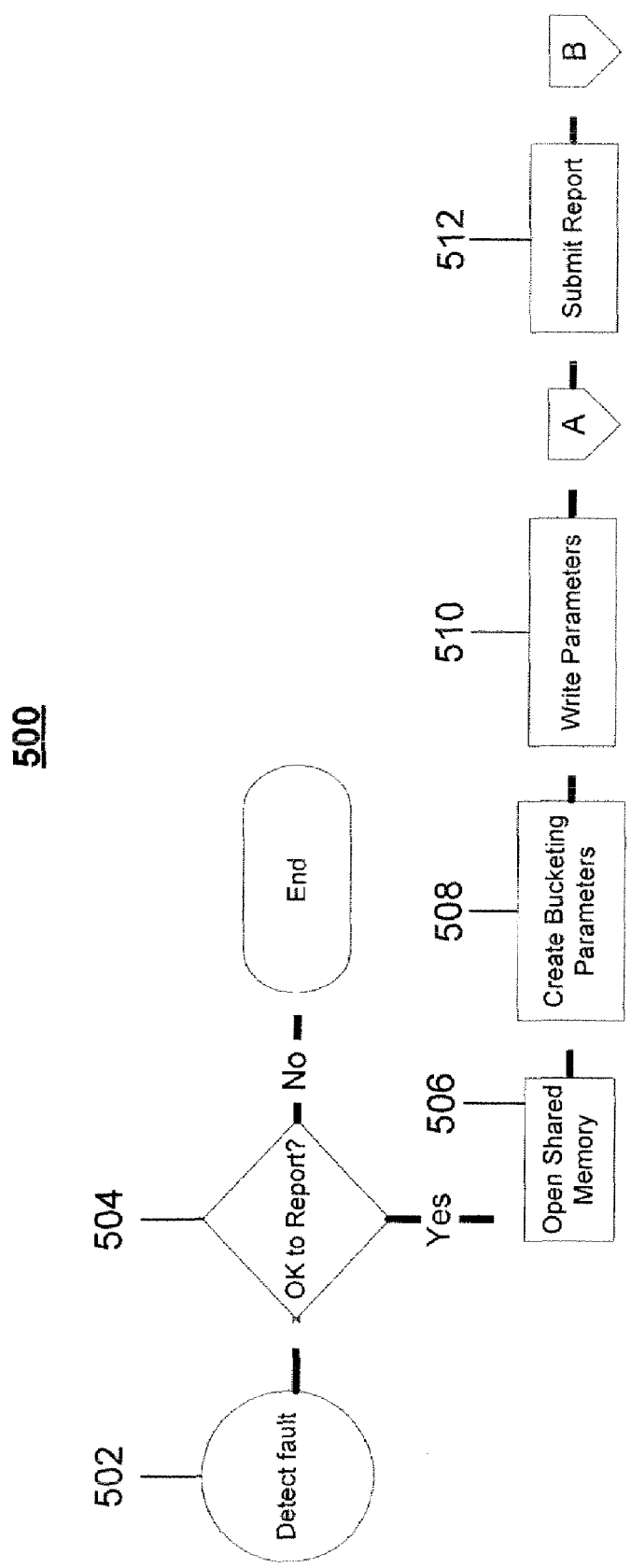
FIG. 5 is a flow chart depicting, in particular, a method for reporting exception data within a system for client side analysis for identifying failing ram after a user mode or kernel mode exception.
Figure 6:
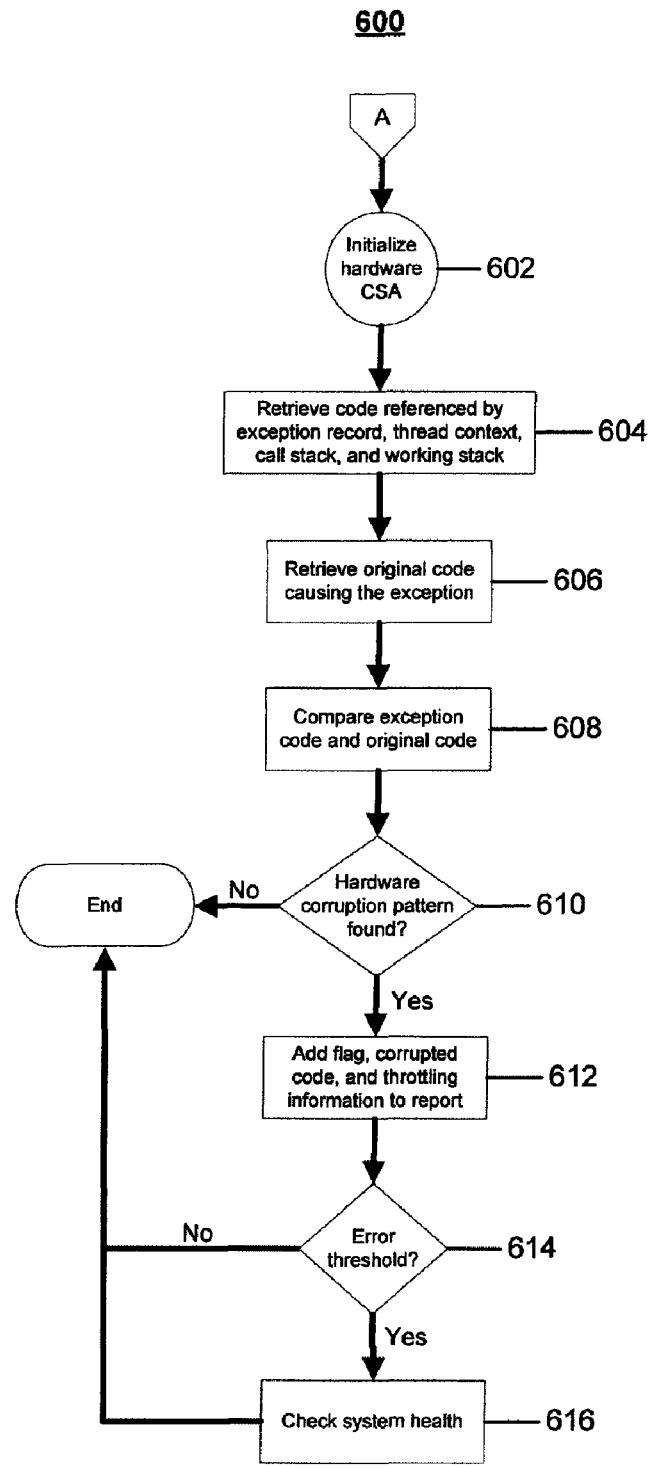
FIG. 6 is a flow chart depicting, in particular, a method for client-side analysis within a system for client side analysis for identifying failing ram after a user mode or kernel mode exception.

At block 616, if the exception 320 threshold of block 614 is met or exceeded, a client-side health analysis may be performed. In one embodiment, the client-side health analysis checks hardware and software of the client machine 110 that was involved in the exception 320 detected at block 502 (FIG. 5). In a further embodiment, the client-side health analysis includes software only and may be focused on the exception-causing code or may include program modules 136, 146 that are related or unrelated to the exception code.

If no corruption pattern was found at block 610, the error threshold was not meat block 614, or the client machine 110 checks the system health at black 616, the CSA API 600 terminates and, at block 512 (FIG. 5), resumes the reporting API 500.

Returning to FIG. 5, at block 512, the reporting API 500 may submit the report 405 through a network 173 to the remote error reporting service 180. In one embodiment, the final report 405 contains at a least the bucketing parameters created at block 508 and data regarding any corrupt system memory 130 and RAM 132 gathered by the CSA API 600. Of course, the report 405 may also contain any other data that may facilitate diagnosing corrupt RAM 132.

Figure 7:
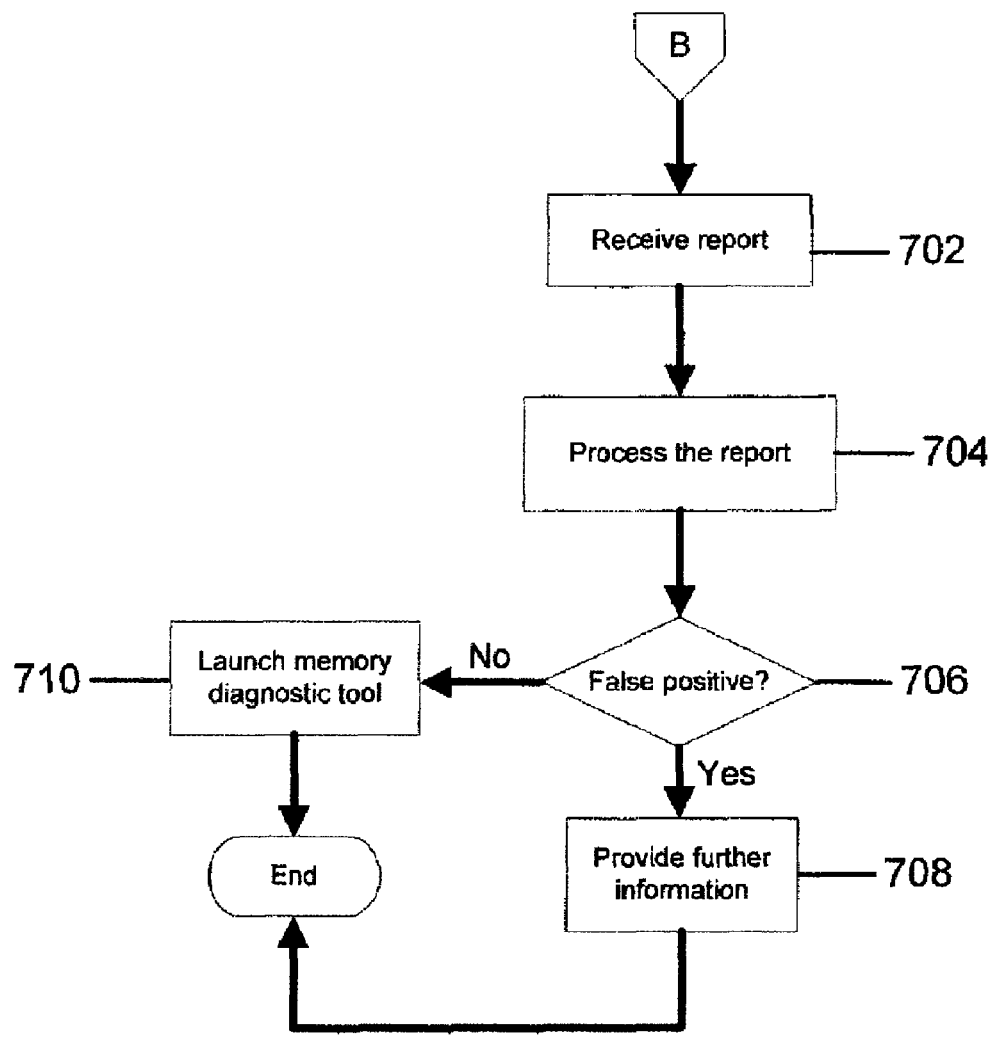
FIG. 7 is a flow chart depicting, in particular, a method for crash analysis within a system for client side analysis for identifying failing ram after a user mode or kernel mode exception.

Referring to FIG. 7, a crash analysis API 700 executing on the remote error reporting service 180 may receive the report 405 at block 702. In one embodiment, the crash analysis API 700 uploads the report 405 to a remote error reporting service 180, server, or other computer 110 and documents all records received from a reporting API 500 or similar process.

At block 704, the crash analysis API 700 may process the report. In one embodiment, the crash analysis API 700 identifies information in the report 405 that facilitates a response 410 (FIG. 4) to be sent to the client machine 110. For example, the crash analysis API 700 may identify the flag, code, and throttling information added to the report at block 612 (FIG. 6) as well as the bucketing parameters added to the report 405 at block 510 to determine what, if any, response 410 to send to the client machine 110. The client machine 110 executing the CSA API 600 (FIG. 6) may discover a hardware corruption pattern at block 610 from the code comparison executed at block 608. While the comparison may appear to be a legitimate RAM 132 or other hardware corruption pattern (i.e., the one-bit 324 or stride 334 patterns of FIGS. 3*a* and 3*b*, respectively), the remote error reporting service 180 may discover that, in combination with other reports 405 from other client machines 110, the fault is likely not due to corrupt hardware. One example of such a "false-positive" hardware corruption could be the remote error reporting service 180 receiving a high number of similar bucketing parameters indicating the same process failure, wherein the failure is due to a wide variety of hardware devices. Because memory 130 exception 320 are most likely unique to the individual machine, the exact or similar exception 320 on many different client machines 110 would most likely indicate corrupt software or another cause and would not indicate corrupt RAM 132. Of course, the crash analysis API 700 may determine many other situations in which the client machine 110 may falsely identify corrupt memory 130 or RAM 132 as source of an exception 320.

If, at block 706, the processed report 405 results in a corrupt hardware false positive, at block 708, the crash analysis API 700 may provide a response 410 that includes further information about the exception 320. In one embodiment, the response 410 to a corrupt hardware false positive includes an explanation of the exception 320 and instructions to prevent it from happening again. For example, the response to a corrupt hardware false positive may include audio and video information related to the exception 320 and may also include a hyperlink to information within a consolidated, online error management (OEM) source. The response 410 may also include information about future releases of the software causing the exception 320, suggestions for software or hardware additions to the client machine 110 that may alleviate the exception 320 or future, related exceptions 320, and any other information that may assist the client machine 110 user.

If, at block 706, the processed report 405 indicates that the fault was likely due to corrupt hardware at the client machine 110, at block 710, the crash analysis API 700 may provide a response 410 that launches a memory 130 diagnostic tool. In one embodiment, the memory diagnostic tool is launched automatically by the response 410. In a further embodiment, the response 410 advises a user of the client machine 110 to optionally launch a memory diagnostic tool. For example, the client machine 110 may include a memory diagnostic tool as an application program 135, 145 or other program module 136, 146. In a still further embodiment, the crash analysis API 700 may provide no response 410 even though corrupt hardware at the client machine 110 was the likely cause of the fault. For example, the fault may not be adequately documented at the remote error reporting service 180 to justify taking any action at the client machine 110. Once the remote error reporting service 180 achieves proper documentation of the fault, a response 410 may be generated for the client machine 110.

Thus, the previously-described system and method is believed to be useful in the identification and diagnosis of RAM 132 or other hardware failures resulting from an exception 320 or other computer 110 or computer system 100 error. Additionally, as claimed below, the system may execute steps of a process that, as a final result, produce the useful, concrete, and tangible result of identifying malfunctioning physical portions of RAM 132, system memory 130, or other hardware that cause an exception 320 or other error during operation of the computer 110. The identification of failing or corrupt hardware may allow replacement or repair of the hardware to alleviate future computer 110 errors. Of course, many other real-world, tangible results may flow from the identification of failing RAM 132, system memory 130, or other hardware from computer 110 errors and exceptions 320.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method for identifying corrupt system memory resulting in a computing system failure comprising:
    loading a run-time executable code from a non-volatile memory of the computing system to the system memory;
    executing a process from the run-time executable code on the computing system;
    detecting an exception caused by the process executing on the computing system;
    reading the run-time executable code from the system memory;
    reading a stored executable code from the non-volatile memory of the computing system, the stored executable code comprising an original copy of the run-time executable code;
    pre-processing the stored executable code by applying memory relocation instructions of the run-time executable code to the stored executable code;
    comparing the run-time executable code and the pre-processed stored executable code;
    ignoring mismatched bytes between the run-time executable code and the pre-processed stored executable code, the mismatched bytes known to be modified by an operating system of the computing system;
    identifying one or more corrupt hardware system memory locations in the run-time executable code when the run-time executable code and the pre-processed stored executable code are not identical;
    determining if the one or more one corrupt hardware system memory locations identify a corrupt system memory pattern;
    examining the corrupt system memory pattern to determine if the corrupt system memory pattern is associated with software;
    if the corrupt system memory pattern is determined to be associated with software, provide an indication of the association of the corrupt system memory pattern with software; and
    if the corrupt system memory pattern is not determined to be associated with software, examine the corrupt system memory pattern to determine if the corrupt system memory pattern is associated with corrupt system memory.

2. The method of claim 1, wherein the exception includes a plurality of memory pointers referring to locations in the system memory of the computing system that contained the loaded run-time executable code causing the exception.

3. The method of claim 2, further comprising reading the run-time executable code from the locations in the system memory of the computing system referred to by the plurality of memory pointers.

4. The method of claim 1, wherein the run-time executable code includes at least one of an exception parameter, an exception thread context, an exception call stack, or a working set of exception processes.

5. The method of claim 1, further comprising identifying the run-time executable code as the cause of the computing system failure.

6. The method of claim 1, wherein reading the run-time executable code includes collecting a number of pages of the run-time executable code from the system memory, wherein the number of pages is below a threshold amount.

7. The method of claim 6, wherein the threshold amount is) no more than 512 kilobytes.

8. The method of claim 1, wherein loading the stored executable code from the non-volatile memory of the computing system comprises loading the stored executable code using unbuffered I/O.

9. The method of claim 1, wherein both the run-time executable code and the stored executable code are in a binary format.

10. The method of claim 1, wherein the corrupt system) memory pattern includes at least one of a one-bit corruption pattern or a stride corruption pattern;
    wherein the one-bit corruption pattern includes one instance of the first and second address of the system memory not being identical; and
    wherein the stride corruption pattern includes a plurality of alternating instances of the first and second address of the system memory not being identical.

11. The method of claim 10, further comprising ignoring the corrupt system memory pattern if it is not the one-bit corruption pattern or the stride corruption pattern.

12. The method of claim 1, further comprising:
    adding the run-time executable code to an error report;
    communicating the error report to a remote error reporting service; and
    initiating a hardware diagnostic routine.

13. The method of claim 1, further comprising adding the indication of the corrupt system memory to an error report if the corrupt system memory pattern is identified.

14. The method of claim 1, further comprising determining a number of past identifications of the corrupt system memory pattern.

15. The method of claim 1, wherein the corrupt system memory pattern indicates that the computing system failure was caused by corrupt system memory if at least one of:
    a number of exceptions corresponding to a number of different processes indicate the corrupt system memory pattern, wherein the number of exceptions and the number of corresponding processes is above a threshold.

16. The method of claim 1, wherein loading the stored executable code from the non-volatile memory of the computing system comprises loading the stored executable code from a hard disk drive of the computing system.

17. A method for client-side analysis for identifying failing RAM after a user mode or kernel mode exception comprising:
    loading a run-time executable code from a non-volatile memory of the computing system to the RAM;
    executing a process from the loaded run-time executable code on the computing system, the process reading from and writing to a plurality of locations in the RAM during the process execution;

detecting an exception at a time during the process execution, the exception caused by the process executing on the computing system, the exception including a plurality of memory pointers referring to the plurality of locations in the RAM that were being read from or written to at the time of the exception during the process execution;

identifying a portion of the loaded run-time executable code in the RAM that caused the exception from the plurality of memory pointers;

reading the portion of the loaded run-time executable code from the RAM;

reading an uncorrupted copy of the portion of the loaded run-time executable code that caused the exception from the non-volatile memory of the computing system, the uncorrupted copy of the portion of the loaded run-time executable code comprising an original copy of the loaded run-time executable code;

pre-processing the uncorrupted copy of the portion of the loaded run-time executable code by applying memory relocation instructions of the portion of the loaded run-time executable code to the uncorrupted copy of the portion of the loaded run-time executable code;

comparing the portion of the loaded run-time executable code in the RAM that caused the exception with the pre-processed uncorrupted copy of the portion of the loaded run-time executable code causing the exception, the comparing including ignoring mismatched bytes known to be modified by an operating system of the computing system;

identifying a corrupt system memory pattern in the portion of the loaded run-time executable code in the RAM that caused the exception when the portion and the pre-processed uncorrupted portion are not identical, the corrupt system memory pattern comprising either a one-bit corruption pattern or a stride corruption pattern;

examining the system memory if the corrupt system memory pattern indicates that the computing system failure was caused by corrupt system memory; and providing an indication that the corrupt system memory pattern was caused by corrupt system memory.

18. The method of claim 17, wherein the portion of the loaded run-time executable code in the RAM that caused the exception includes a plurality of incorrect instructions and the uncorrupted copy of the portion of the loaded run-time executable code causing the exception includes a plurality of correct instructions;

wherein the one-bit corruption pattern includes, within the plurality of incorrect instructions, at least one incorrect instruction that references a first RAM address that is one bit away from a second RAM address, wherein the second RAM address is referenced by one of the correct instructions;

wherein the stride corruption pattern includes, within the plurality of incorrect instructions, a correct instruction that references a correct RAM address, the correct instruction between two incorrect instructions that reference incorrect RAM addresses.

19. A computer system comprising a processor for executing computer executable instructions, a system memory for temporarily storing data related to the computer executable instructions, a non-volatile memory for permanently storing data related to the computer executable instructions, and an input/output circuit, the computer executable instructions comprising instructions for identifying failing memory after a user mode or kernel mode exception, the computer executable instructions comprising instructions for:

loading a run-time executable code from the non-volatile memory of the computer system to the system memory;

executing a process from the run-time executable code on the computer system;

detecting an exception caused by the process executing on the computer system, the exception including a plurality of exception pointers referring to a system memory address containing a corrupted portion of the run-time executable code that caused the exception;

reading the run-time executable code from the system memory with the plurality of exception pointers;

reading a stored executable code from the non-volatile memory of the computer system, the stored executable code comprising an original copy of the run-time executable code and including an uncorrupted portion of the run-time executable code that caused the exception;

pre-processing the stored executable code by applying memory relocation instructions of the run-time executable code to the stored executable code;

comparing the run-time executable code and the pre-processed stored executable code;

ignoring mismatched bytes between the run-time executable code and the pre-processed stored executable code, wherein the mismatched bytes are known to be modified by an operating system of the computing system;

identifying a corrupt system memory pattern in the run-time executable code when the run-time executable code and the pre-processed stored executable code are not identical;

determining whether the corrupt system memory pattern is associated with a type of corruption pattern; and providing an indication in a report of the type of corruption pattern.

* * * * *